United States Patent [19]

Sorenson

[11] Patent Number: 4,614,973

[45] Date of Patent: Sep. 30, 1986

[54] METHOD AND APPARATUS FOR GENERATING TIMING PULSES

[75] Inventor: Greg A. Sorenson, Beaverton, Oreg.

[73] Assignee: Tektronix, Inc., Beaverton, Oreg.

[21] Appl. No.: 537,313

[22] Filed: Sep. 28, 1983

Related U.S. Application Data

[63] Continuation-in-part of Ser. No. 483,332, Apr. 8, 1983, abandoned.

[51] Int. Cl.[4] .............................................. H04N 5/08
[52] U.S. Cl. .................................... 358/153; 358/148; 358/155; 358/149; 328/63; 328/119; 328/139; 307/269; 307/518; 375/94; 375/106
[58] Field of Search ............... 358/148, 149, 150, 153, 358/155, 152, 158, 21 V, 154; 328/63, 119, 57, 108, 109, 110, 111, 132, 138, 139, 178, 179; 307/269, 518, 231, 234, 260, 511, 516, 517, 526, 527; 375/94, 106, 108, 110, 113, 118

[56] References Cited

U.S. PATENT DOCUMENTS

3,727,142  4/1973  De Sipio et al. .................... 328/111
4,232,267  11/1980  Hanajima et al. .................... 328/138

Primary Examiner—James J. Groody
Assistant Examiner—Michael D. Parker
Attorney, Agent, or Firm—John Smith-Hill; Francis I. Gray

[57] ABSTRACT

Timing pulses are generated in response to an input signal which includes a train of nominally periodic pulses by determining whether a detected pulse of the input signal is a pulse of the train of nominally periodic pulses, employing a detected pulse of the pulse train to initiate cyclical production of pulses with a period dependent on the nominal period of the pulse train, and using the cyclically produced pulses to generate the desired timing pulses. In a gen-lock circuit, this arrangement facilitates acquiring lock to a noisy signal.

3 Claims, 7 Drawing Figures

METHOD AND APPARATUS FOR GENERATING TIMING PULSES

CROSS-REFERENCE TO RELATED APPLICATION

This is a continuation-in-part of co-pending application Ser. No. 483,332 filed Apr. 8, 1983 and now abandoned.

This invention relates to method and apparatus for generating timing pulses, particularly timing pulses which are in timed relation to nominally periodic pulses of an input signal.

BACKGROUND OF THE INVENTION

In a digital frame synchronizer, gen-lock circuits are used to generate trains of pulses for timing operation of the frame synchronizer in relation to an input video signal and a reference video signal respectively. The input gen-lock circuit, for example, generates pulses which are timed with reference to the horizontal sync edges of the input video signal. A problem may arise, however, in the event that the input video signal is noisy, since it may then contain spurious sync pulses, i.e., pulses which appear to the gen-lock circuit to be sync pulses but are not in fact valid sync pulses, and true sync pulses may be missing. This disturbs operation of the gen-lock circuit, to the extent that it may lose lock and may cause the frame synchronizer to go into a freeze mode.

SUMMARY OF THE INVENTION

According to a first aspect of the present invention there is provided a method of generating timing pulses in response to an input signal which includes a train of nominally periodic pulses, comprising detecting a pulse of the input signal, determining whether the detected pulse is a pulse of said train of nominally periodic pulses, employing a detected pulse of said pulse train to initiate cyclical production of pulses with a period dependent on the nominal period of said pulse train, and using the cyclically produced pulses to generate said timing pulses.

According to a second aspect of the present invention there is provided apparatus for generating timing pulses in response to an input signal which includes a train of nominally periodic pulses, comprising first means responsive to said input signal to detect a pulse of the input signal, second means for determining whether the detected pulse is a pulse of said train of nominally periodic pulses, third means for employing a detected pulse of said pulse train to initiate cyclical production of pulses with a period dependent on the nominal period of said pulse train, and fourth means for using the cyclically produced pulses to generate said timing pulses.

In a preferred embodiment of the invention, the pulses that are produced cyclically in response to a detected pulse train establish timing origins by reference to which the input signal is subsequently sampled to detect successive pulses of the pulse train.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

OVERVIEW

Figure 1:
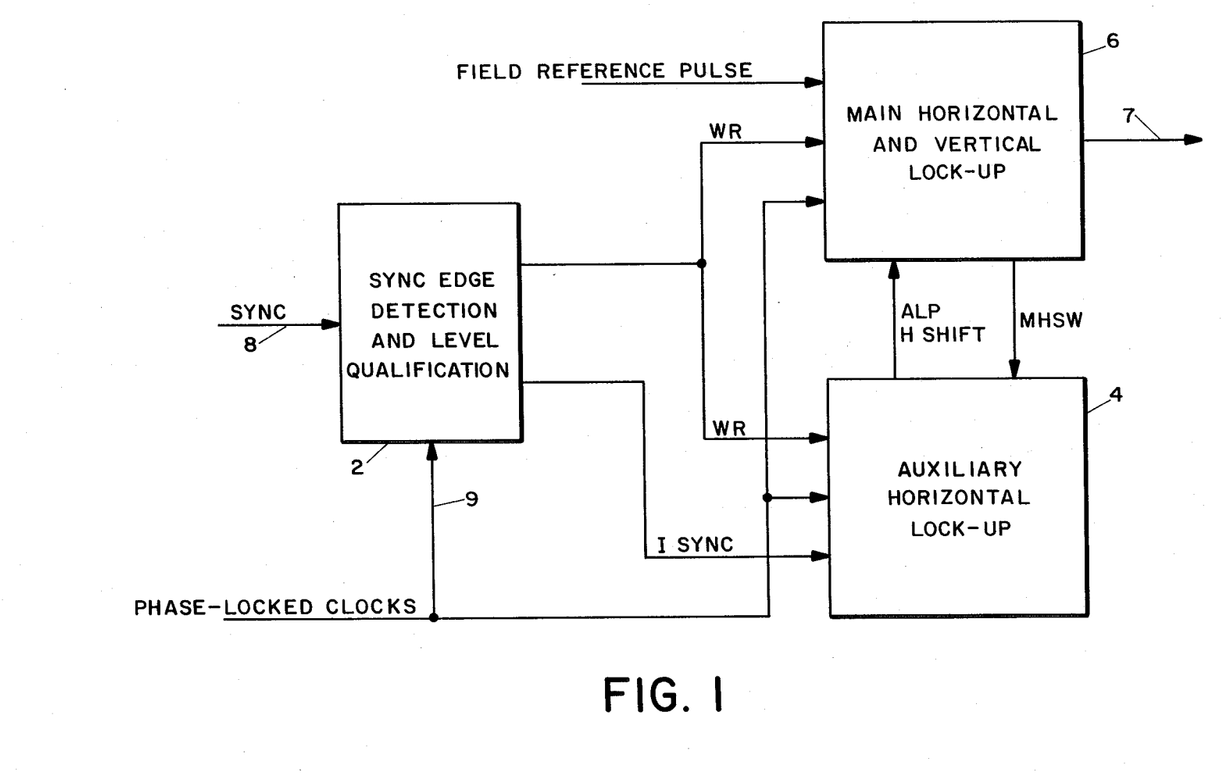
FIG. 1 is a block diagram of a gen-lock circuit embodying the present invention.

The illustrated circuit comprises three main devices, namely a sync edge detection and level qualification device 2, an auxiliary horizontal lock-up device 4 and a main horizontal and vertical lock-up device 6.

The device 2 receives an input signal on a line 8 which represents horizontal sync of a composite video signal. The video signal may be noisy, in which case the input signal may include spurious pulses, and some sync pulses may be missing. The device 2 provides outputs to the device 4 which enable the latter to identify which sync pulses are valid and to ignore the absence of missing sync pulses. The main horizontal and vertical lock-up device 6 is controlled in dependence on horizontal timing through the device 4 and in dependence on vertical timing by a field reference pulse. The device 6 provides several pulses trains on its output lines 7, which pulse trains are timed with reference to horizontal and/or vertical sync, as represented by the field reference pulse. The preferred embodiment of the invention is used for controlling the timing of a frame synchronizer, and it will therefore be appreciated that the device 6 provides much more than horizontal sync pulses and vertical sync pulses on the lines 7. The invention is not restricted to use with a television frame synchronizer, however, and can be used in other applications in which it is necessary to recover timing information from a noisy input signal.

The preferred embodiment of the invention was designed for use with the NTSC color television system. The invention is, however, applicable to other color television systems and to monochrome television systems, with modifications which will readily suggest themselves to persons skilled in the art. Therefore, this description will not dwell on the nature of the modifications which would have to be made for use with other television systems.

SYNC EDGE DETECTION AND LEVEL QUALIFICATION DEVICE

Figure 2:
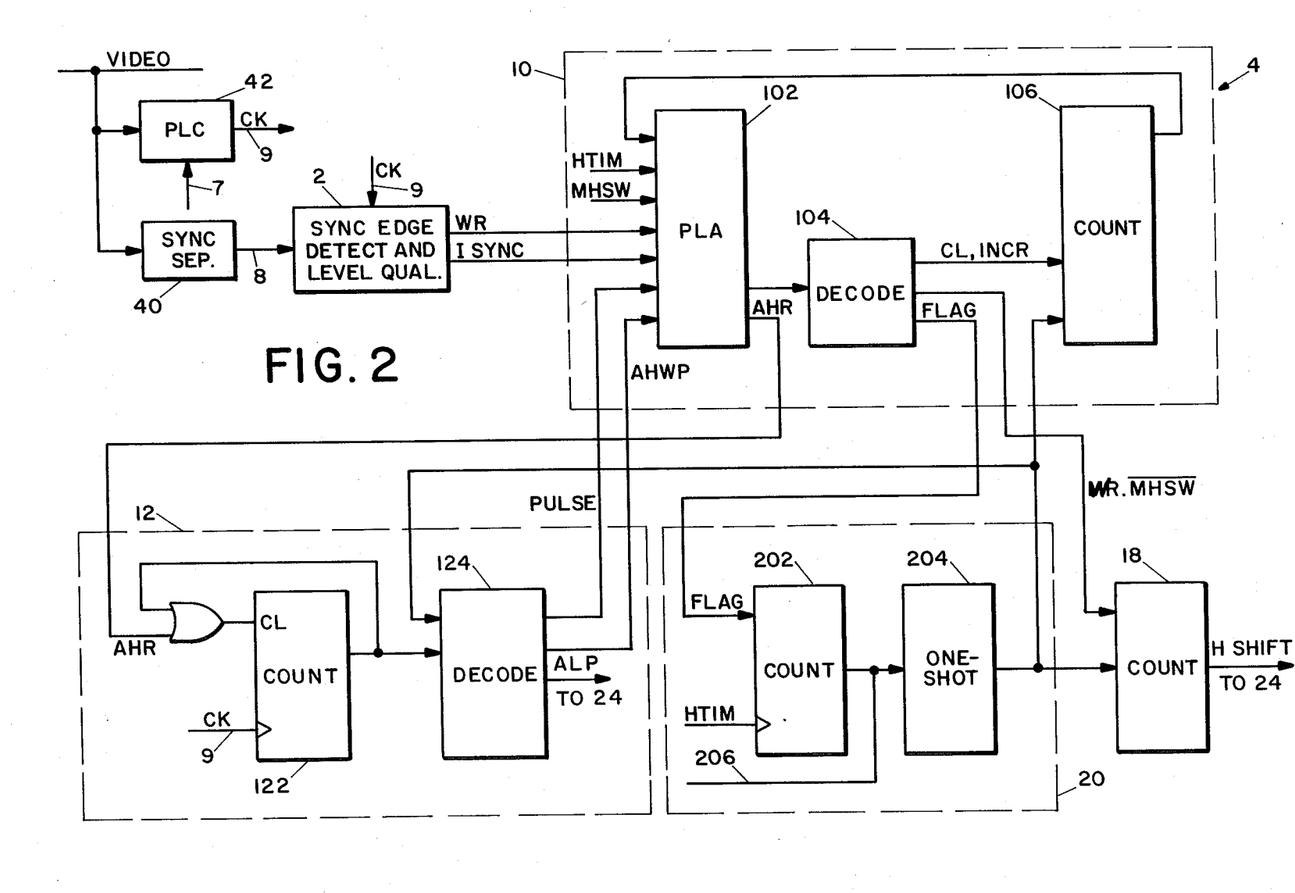
FIGS. 2 and 3 are more detailed block diagrams of respective parts of the gen-lock circuit.

The sync edge detection and level qualification device 2 receives on the line 8 an input signal comprising separated horizontal sync pulses. Thus, the composite video signal is applied in conventional manner to a sync separator 40 and the sync separator provides an output pulse in response to each negativegoing pulse of the composite video signal which exceeds a predetermined magnitude, e.g., 50% of the nominal sync amplitude. It will, of course, be recognized that the sync separator 40 cannot distinguish between true sync pulses and noise spikes which qualify in terms of magnitude and polarity for treatment as sync pulses, and that a true sync pulse may be masked by noise. Thus, if the input video signal is noisy, the signal provided by the sync separator will include spurious pulses (i.e., pulses not representing true sync pulses), and some true sync pulses will be missing, i.e., will not be represented by pulses provided by the sync separator. The purpose of the device 2 is to enable spurious sync pulses to be identified and suppressed.

The device 2 also receives on a line 9 an input from a phase-locked clock generator 42. When the clock generator is properly synchronized with the color subcarrier, it generates clock pulses at four times subcarrier frequency, i.e., it generates 910 clock pulses in the nominal line time. When the device 2 detects the leading edge of a pulse on the line 8, it causes a digital pulse WR to be generated in timed relation to the occurrence of the next clock pulse. It will be understood that the clock generator does not always remain synchronized with the color subcarrier.

The device 2 also includes an integrator which provides a pulse I sync which starts when the detected sync pulse has lasted a predetermined time (e.g. 1.5 $\mu$s) such that statistically it is probably not a noise spike, and continues until the sync pulse ends. The outputs of the device 2 are applied to the device 4, and the pulse WR is additionally applied to the device 6.

AUXILIARY HORIZONTAL LOCK-UP DEVICE 4

The auxiliary horizontal lock-up device 4 comprises an auxiliary controller 10 and an auxiliary counter and decode block 12. The controller 10 comprises a state machine 102, implemented as a programmable logic array, a decoder 104 and a counter 106, and the counter and decode block 12 comprises a counter 122 and a decoder 124. The controller 10, which is characterized by the state diagram shown in FIG. 4, receives the pulses WR and I sync. Assuming that the auxiliary horizontal lock-up device 4 is not at that time locked to horizontal sync, and is attempting to acquire lock, the controller 10 is in the state a. If, while in the state a, the controller receives a pulse WR, it provides a pulse AHR to the counter 122 of the block 12, and advances into state b. The pulse AHR serves to reset the counter 122 of the block 12. The counter 122 then commences counting the clock pulses CK provided by the phase-locked clock generator 42 on the line 9. From state b, the controller advances to state c. State b is provided in order to introduce delay between the states a and c, so that the counter 122 is properly reset and valid information is provided at the output of the decoder 124 before the controller enters state c. In state c, the controller commences a procedure to determine whether the pulse WR represented a valid sync pulse. This is done by determining whether the pulse I sync is present about 1.9 $\mu$s after the pulse WR. Thus, the counter 122 causes the decoder 124 to generate a pulse PULSE 1.9 $\mu$s after the pulse WR, and the controller 102 determines whether the pulse I sync is present when the pulse PULSE is received. If the pulse I sync is absent when the pulse PULSE is received, it is determined that the pulse WR did not represent a valid sync pulse, and the controller passes to the state d. The counter 122 continues counting, and when it reaches a count of 910 it is reset and causes the decoder to generate a pulse AHWP, and the controller passes to the state e. The controller remains in the state e until the pulse AHWP is no longer present, and then passes to the state a. It will therefore be appreciated that there is a delay of slightly more than one line (e.g., one line plus two phase locked clock pulses) between the time the controller left the state a and the time the controller returns to the state a. This wait period is included because the video signal may include artifacts which cause WR pulses to be generated approximately a line apart but which are not in fact sync pulses, and it is desired to avoid delaying acquisition of lock by repeatedly sampling these pulses and attempting to validate them with I sync.

Figure 4:
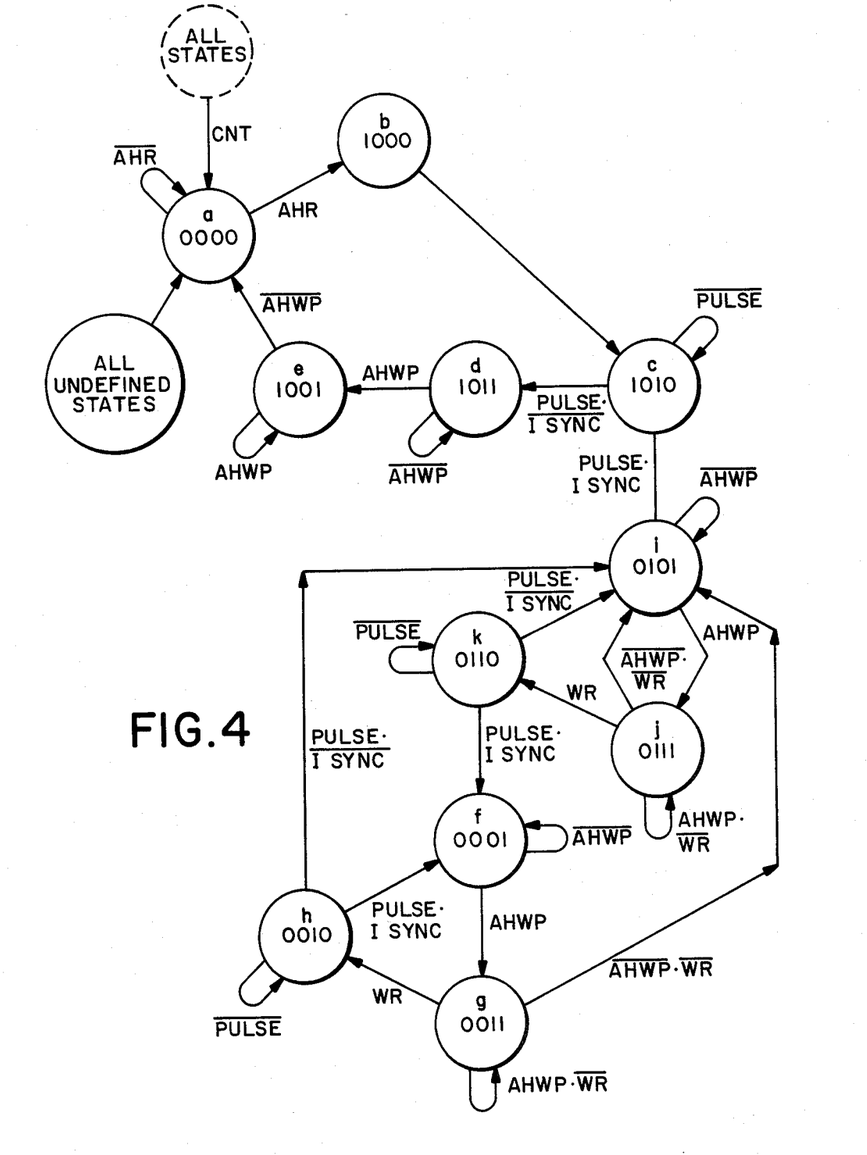
FIG. 4 is a state diagram illustrating the manner of operation of one of the components shown in FIG. 2.

The next pulse WR received while the controller is in state a causes the controller to generate the pulse AHR again, which resets the counter 122 of the block 12. This sequence of reset and wait continues until the controller determines that the pulse WR represents a valid sync pulse. Thereupon the controller passes from the state c to the state i, and the counter 122 is permitted to continue counting.

The counter 122 counts to 910. When the counter 122 reaches a count of 910, the counter is reset and causes the decoder 124 to generate the pulse AHWP, which is an auxiliary horizontal window pulse. This window pulse brackets the time at which the next pulse WR representing a valid sync pulse should occur. When the pulse AHWP is present, the controller is in state j. If a pulse WR is received while the controller is in the state j, the controller advances to the state k. If the pulse WR does not occur while the controller is in the state j, the controller returns to the state i, and remains in the state i until the next pulse AHWP is received.

When the counter reaches a count of 910, it also generates an auxiliary lock pulse ALP which is supplied to the main horizontal and vertical lock-up device 6.

Assuming that the controller advanced from the state j to the state k, the pulse WR must be qualified by I sync. As before, the pulse PULSE is generated by the decoder 124 and causes the controller 102 to sample I sync about 1.9 $\mu$s after the pulse WR. If the pulse I sync is present, the controller advances from the state k to the state f. If, however, on occurrence of the pulse PULSE, the pulse I sync was not present, the controller returns to the state i. Each time that the controller passes to the state i from state c, g, h, j or k, the counter 106 within the block 10 is incremented, and if a count of four is obtained, the controller returns to the state a. If the input signal is noisy, the counter 106 is allowed to accumulate a count of eight before it is assumed that lock has been lost and the controller returns to the state a. When the controller advances from the state k to the state f, the counter 106 is cleared. The auxiliary horizontal lock-up device 4 is considered to have acquired lock when it enters the state f from the state k, and to retain lock so long as it remains in the states f, g and h.

When in the state f, the pulse AHWP is generated when the counter 122 reaches a count of 910, and the controller enters the state g and remains in the state g so long as the pulse AHWP is present. If, while the controller is in the state g, the pulse WR is received, the controller advances to the state h, and the pulse WR is qualified by I sync in the same manner as it was when the controller was in the state k, and the controller passes to the state f. Assuming that a series of valid WR pulses is received, and no pulses are missing, the controller circulates in the states f, g and h.

If, in the state g, a pulse WR is not received, the controller returns to the state i. Similarly, if the pulse WR is received, but it is not qualified by I sync, the controller returns to the state i from the state h. Thus, the controller checks both the position of the sync pulse, by reference to the position of the pulse W relative to the pulse AHWP, and also checks the duration of the sync pulse by reference to the state of the pulse I sync at the time of occurrence of the pulse PULSE. The same sequence of steps then follows to determine whether lock has been lost, and if, within the next four occurrences of the pulse WR (eight if the signal is noisy) the controller fails to return to state f, it is confirmed that lock has been lost and the controller returns to the state a.

So long as the controller remains in the loop a, b, c, d, e, the decoder 104 provides a pulse FLAG to a counter 202 of the noise count block 20. When the controller passes from the state c to the state i, the counter 202 is cleared. When the counter 202 is enabled by the pulse FLAG, it counts pulses received at line rate from the device 6 and when it reaches a total of four (corresponding to four lines of the video signal), it causes a one-shot 204 to generate a pulse which is applied to the horizontal shift detection block 18. The input video signal is considered to be noisy if the one-shot 204 is triggered.

The auxiliary lock pulse ALP generated in response to a given pulse WR (representing a valid sync pulse) coincides with the pulse WR representing the next sync pulse, provided that lock has been acquired and the sync pulses are occurring at the proper rate. The pulse ALP is applied to the main horizontal and vertical lock-up device 6. These auxiliary lock pulses are timed with reference to the actual sync pulses and occur at intervals equal to the nominal period of the sync pulse train, while being immune to the absence of up to four sync pulses (8 in the case of a noisy signal).

Figure 5:
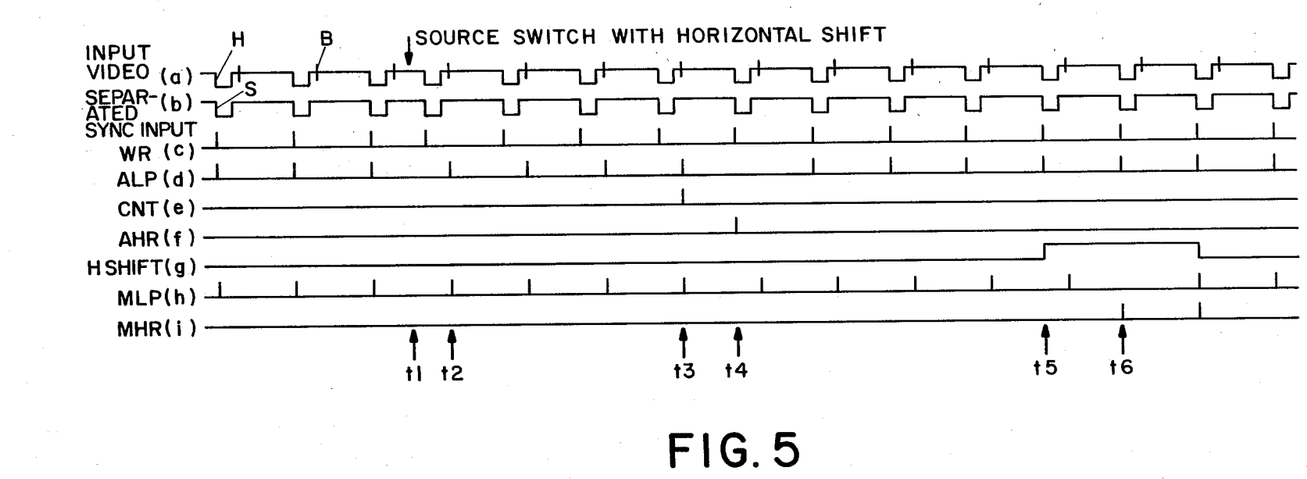
FIGS. 5, 6A and 6B are timing diagrams.

The timing diagram of FIG. 5 illustrates the manner of the operation of the circuit illustrated in FIGS. 1 to 4. In FIG. 5, the top wave form (a) represents the input video signal that is applied to the sync separator 40 and the phase-locked clock generator 2. The input video signal comprises a succession of horizontal sync pulses H each followed by the chrominance subcarrier burst B. Between burst B and the next following horizontal sync pulse H is the active line time of the video signal, which is not particularly illustrated in FIG. 5 since it is not relevant to the invention. The second waveform (b) represents the separated sync pulses S provided on the output of the sync separator 40, whereas the third waveform (c) represents the train of pulses WR. For sake of simplicity, the pulses WR are shown coincident with the leading edges of the separated sync pulses S, but in fact the pulses WR would lag somewhat behind the separated sync pulses S, since the pulse WR is generated in timed relation to the occurrence of the clock pulse CK following the leading edge of the separated sync pulse S. The waveform (d) represents the auxiliary lock pulses ALP, which are windowed by the pulses AHWP.

It will be assumed for the purpose of the following discussion that the source of the input signal was changed at the time t1, following the third sync pulse H so that the fourth sync pulse H occurs too early, and the corresponding pulse WR is not received while the controller is in the state g, i.e., during the next occurrence of the pulse AHWP. Consequently, the controller returns to the state i at the end of the pulse AHWP, which occurs at the time t2, and this is the first indication that the auxiliary controller is no longer locked to sync.

At the time t3, the controller has passed back to the state i following four consecutive occurrences of the pulse AHWP, and an auxiliary unlock pulse CNT is generated and forces the controller to pass to the state a. The pulse CNT is represented by the waveform (e) in FIG. 5. On the next occurrence of a valid sync pulse (at time t4), the corresponding pulse WR causes the auxiliary horizontal reset pulse AHR (see waveform (f) of FIG. 5) to be generated and the counter 122 is reset. The succeeding auxiliary lock pulses ALP then coincide with the pulses WR, assuming that the horizontal sync pulses H are in properly timed relationship. However, there is a shift between the timing of the auxiliary horizontal counter and the main horizontal counter, as represented by the lack of synchronism between the pulses WR and a window pulse MHSW which brackets main lock pulses MLP shown by the waveform (h) of FIG. 5. When auxiliary controller is locked to sync, and four noncoincidences between the pulses WR and MHSW have been detected, the pulse H shift is generated at time t5 as shown by the waveform (g), and the controller block 24 generates a main hoirzontal reset pulse MHR, shown as waveform (i) in FIG. 5, coinciding with the next pulse ALP at time t6. The main horizontal counter 262 is reset by the pulse MHR, and thus the pulses MLP become synchronized once more with the pulses ALP.

The auxiliary controller 10 has an output line which is connected to a horizontal shift detection block 18. The block 18 comprises essentially a counter and operates in conjunction with the main horizontal and vertical lock-up device 6. The device 6 provides a window pulse MHSW to the auxiliary controller 10 defining the interval within which the pulse WR should occur in order for there to be synchronization between the devices 6 and 4. As explained above, when the device 4 is locked to the horizontal sync pulse, represented by the pulse WR, the auxiliary controller 10 then determines whether WR occurs within the window defined by the pulse MHSW. If the pulse WR does not fall within the window MHSW, the controller 10 provides an output pulse to the horizontal shift detection block 18. If the block 18 receives four such pulses relating to four consecutive WR pulses, it provides a pulse H shift to the device 6 to cause the main horizontal and-vertical lock-up device 6 to shift the timing of the main horizontal counter and decode block 28 and thus shift the window pulse MHSW and cause it to bracket once more the pulse WR.

In the event that the input video signal is noisy, as determined by the noise count block 20, the pulse provided by the one-shot 204 alters the initial count loaded into the block 18 so that a pulse H shift is only provided if the block 18 receives eight (rather than four) output pulses from the controller 10 relating to eight consecutive WR pulses. The output pulse provided by the one-shot 204 also causes the counter 106 to change from four to eight the count which gives rise to the assumption that lock has been lost.

There are, of course, other ways of determining that the video signal is noisy, and accordingly in FIG. 2 the noise count block 20 is provided with an additional input 206 to represent an alternative method of noise detection. The noise count block may be constructed to respond to any one of the noise determined inputs, e.g., the input FLAG from the controller 10, while ignoring the other noise determination input, or to respond to any one of the inputs, or to respond only if both inputs are present.

MAIN HORIZONTAL AND VERTICAL LOCK-UP DEVICE

Figure 3:
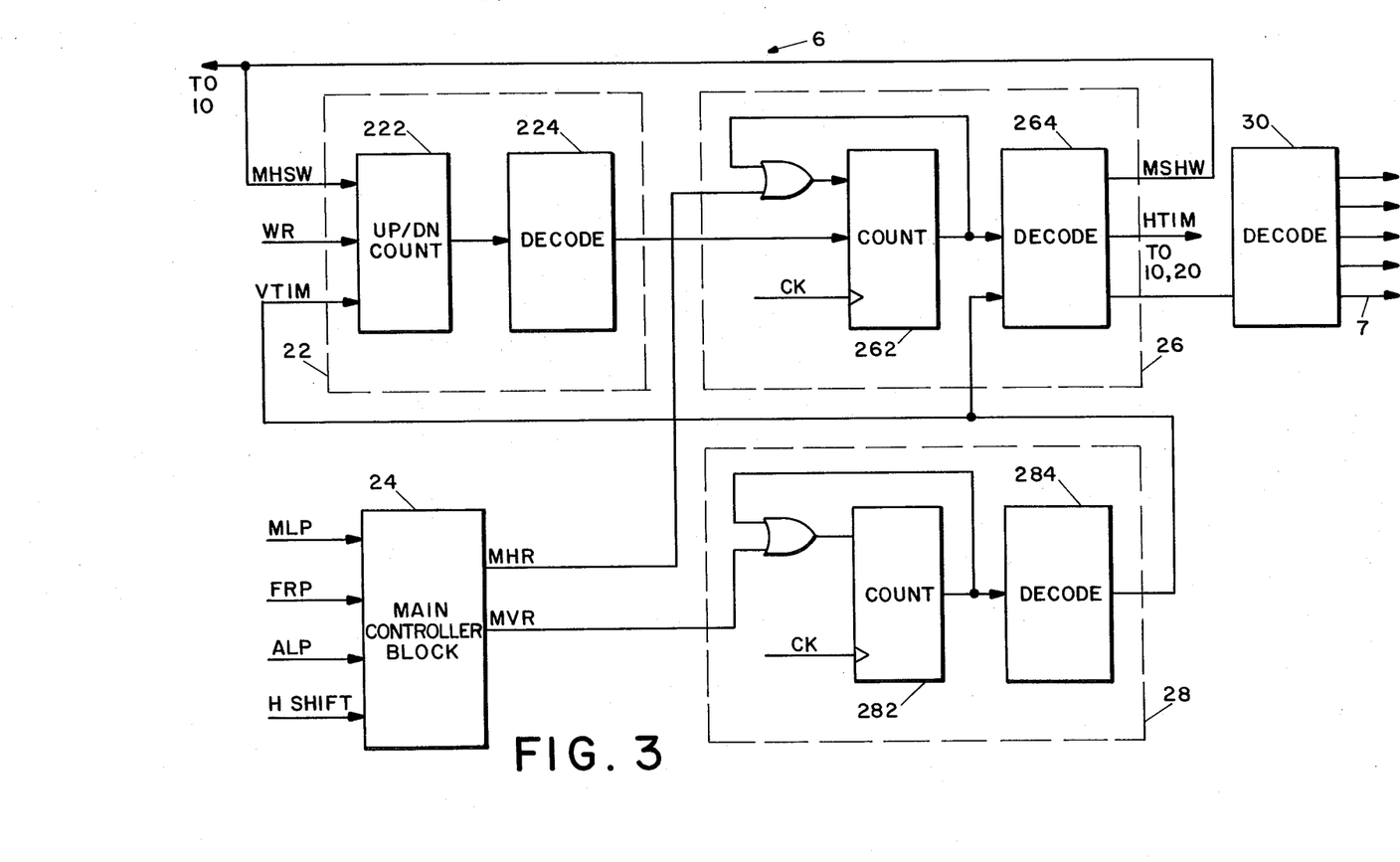

The main horizontal and vertical lock-up device 6 includes a digital sync position average block 22, a main controller block 24, a main horizontal counter and decode block 26, a main vertical counter and decode block 28 and an output decode block 30.

It will be recalled that the output lines 7 of the circuit are derived from the device 6. In fact, they originate from the decode block 30 of the device 6. The function of the main controller block, which performs combination logic functions, is to assure synchronism between the main horizontal counter block 26 and the auxiliary horizontal counter and decode block 12, and to synchronize the main vertical counter and decode block 28 with both the block 26 and the field reference pulse.

The main controller 24 performs combinational logic functions using the pulses ALP and H shift from the auxiliary counter and decode block 12 and the horizontal shift detection block 18 respectively. Thus, in the event that the device 4 is locked to valid WR pulses which are outside the window MHSW, and therefore there has been a horizontal shift in the sync pulses, the block 18 provides a pulse H shift to the main controller block 24. If the pulse H shift is present when a pulse ALP is received from the decoder 124, the controller block 24 generates a pulse MHR which causes the counter 262 of the main horizontal counter and decoder block 26 to be reset. The pulse ALP is generated one count of the counter 122 prior to reset of the counter, and the timing of the main controller block 24 is such that the pulse MHR resets the counter 262 in coincidence with reset of the counter 122. Thus, the counters 122 and 262 become synchronized once more. Once the main horizontal counter 262 is synchronized with the auxiliary horizontal counter 122, the pulse WR is within the window pulse MHSW once more and the counter of the block 18 is cleared, removing the pulse H shift.

The decoder 264 provides outputs to the output decode block 30 and also generates the pulse MHSW. In addition, the decoder 264 generates miscellaneous horizontal timing pulses which are used within the lock circuit, including a main lock pulse MLP which is applied to the main controller block 24. The main lock pulse occurs once each line. The pulse MLP is used in combination with the field reference pulse FRP, which occurs once on each field of the video signal, to generate a main vertical reset pulse MVR at the beginning of each odd-numbered field. Thus, the field reference pulse is generated at the same time with reference to each field, but the clock pulses CK, being timed with reference to the sync edges, bear a difference phase relation to the field reference pulses FRP in alternate, i.e., odd and even numbered, fields. The counter 262 and decoder 264 generate the pulse MLP at a time within the interval defined by the pulse FRP on each odd-numbered field, but outside the interval defined by the pulse FRP on an even-numbered field. The controller block 24 generates pulse MVR when there is coincidence between the pulses MP and FRP and therefore the counter 282 is reset in timed relation to the field reference pulse FRP for each odd-numbered field.

Figure 6A:
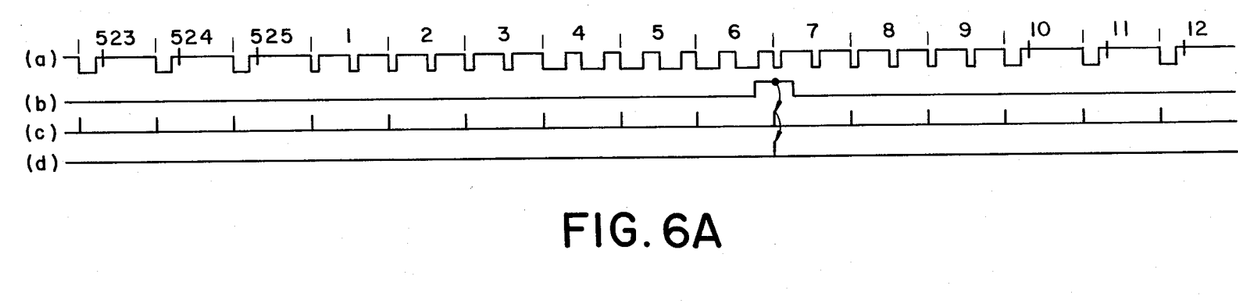
Figure 6B:
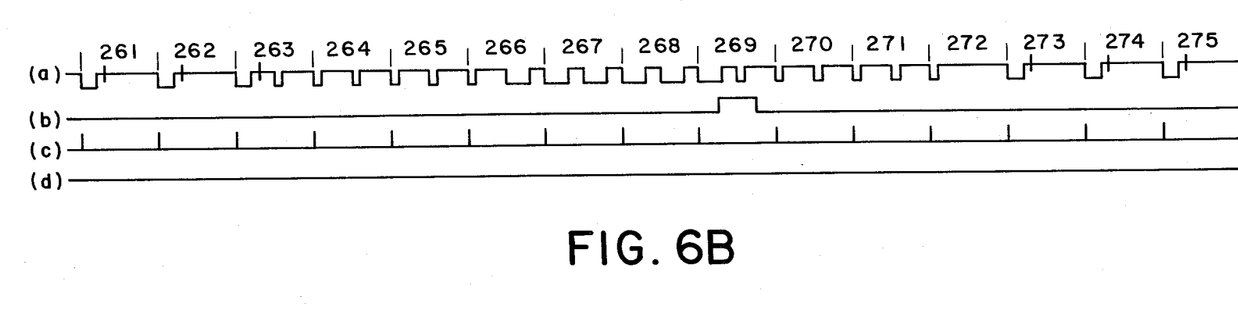

FIG. 6 is a timing diagram for illustrating generation of the main vertical reset pulse MVR. The pulse MVR is generated during the field reference pulse, but only at the beginning of odd-numbered fields. FIG. 6A illustrates pertinent waveforms at the beginning of odd-numbered fields, and FIG. 6B illustrates pertinent waveforms at the beginning of evennumbered fields. The field reference pulse FRP is represented by the waveform (b) in FIGS. 6A and 6B. The field reference pulse brackets the first equalizing pulse following the serration group. The main lock pulses MLP are shown as waveforms (c) in FIGS. 6A and 6B. In the case of odd-numbered fields, the main lock pulse will occur at the falling edge of each even-numbered serration, and therefore a main lock pulse MLP will occur while the field reference pulse FRP is present. However, in the case of even-numbered fields the main lock pulses MLP occur at the falling edge of each odd-numbered serration, and therefore a pulse MLP does not occur during the field reference pulse FRP. The main controller block 24 generates a main vertical reset pulse MVR, represented by the waveform (d) in FIGS. 6A and B, when a pulse MLP occurs during the field reference pulse FRP, and therefore a pulse MVR is generated only at the beginning of the odd-numbered fields.

The decoder 264 is selected to decode the maximum count provided by the counter 262, and has additional address lines which are connected to the output of the decoder 284. Thus, the decoder 264 uses the information provided by the decoder 284 to provide access to additional memory locations in response to each address defined by a count of the counter 262. The decoder 264 thus decodes both the output of the counter 262 and the output of the decoder 284. This could alternatively be implemented by providing the output of the decoder 284 to the decoder 30, which would then serve to combine the outputs of the two decoder 264 and 284. The decoder 284 additionally provides vertical timing information VTIM to the block 22.

It is desired that the pulse WR be centered within the window pulse MHSW. If the pulse WR occurs always at the beginning, e.g., of the window pulse MHSW, a horizontal shift will not be detected by the block 18, but nevertheless the timing of the counter 262 should be adjusted in order that the pulse MHSW is shifted horizontally so that it centers about the pulse WR. For this purpose, the window pulse MHSW is treated as having three regions, namely a beginning region B, a central region C and an end region E. The digital sync position average block 22 receives the window pulse MHSW and the pulse WR and determines, over an entire field, whether the average position of the pulse WR is in the region B, C or E of the window pulse MHSW. Each time the block 22 samples the pulses MHSW and WR and finds the pulse WR inthe region B of the pulse MHSW, it increments a counter 222 by one, and each time it finds the pulse WR within the region E of the pulse MHSW, it decrements the counter 222 by one. At the end of the field, the count accumulated in the counter 222 is used by a decoder 224 to adjust the reset of the main horizontal counter block 26. The sampling times for the block 22 are controlled by the main vertical counter block 28 using the timing information VTIM. Thus, the block 22 does not respond to each occurrence of the window pulse MHSW, but only to selected occurrences so as to provide a weighted average position for the pulse WR within the window MHSW. In a preferred embodiment of the invention, a sample is taken on every fourth line at the beginning of the field, and samples are taken more frequently as the field progresses until they are taken on every line at the end of the field. Thus, the average position, determined by the block 22, is weighted by the most recent occurrences of the pulse WR. Also, in the preferred embodiment the regions B, C and E are established by reference to a window pulse which defines the central region C.

As noted above, the illustrated apparatus is used in conjunction with a phase-locked clock generator 42 which includes a VCO designed to oscillate at four times subcarrier frequency and thus generate 910 clock pulses in the horizontal interval. Conventionally, the phase-locked clock generator is locked to the color subcarrier by opening a sampling window a predetermined time after the horizontal sync edge, at which time burst should be present, and using the burst information thus derived to control the frequency and phase of the clock generator. The difficulty with this conventional approach is that with a noisy signal, spurious syncs are present and some valid syncs are missing. Thus, the sampling window does not accurately sample burst. Accordingly, the phase-locked clock generator may not acquire lock to the color burst. In this event, the frequency of the VCO drifts, and false sampling may cause the frequency to be driven to one or other extreme of the oscillator's frequency range. In such a case, the oscillator of the conventional clock generator no longer reliably generates 910 pulses per line of the video signal, but may generate any number in the range from, e.g., 906 pulses to 914 pulses. In the case of the illustrated apparatus, however, the controller 10 responds to receipt of a pulse WR within a count of ±4 (±2 if the signal is noisy) of 910, i.e., within the pulse AHWP, by generating the pulse AHR to reset the counter 122. The pulse ALP will be generated at a time related to the occurrence of the pulse WR, and will then cause the main horizontal counter and decode block 26 to generate a flag pulse at a predetermined time after the pulse WR such that if the pulse WR was generated in response to the leading edge of a sync pulse, the flag pulse will occur nominally at the time at which burst should occur. Accordingly, the flag pulse is used to open the sampling window and allow the clock generator 42 to sample burst so that the clock generator can become synchronized with the color subcarrier. If a pulse WR is not received within ±4 (±2 if the video signal is noisy) of 910, the counter 122 is reset at 910 until such a pulse WR is received. This allows the auxiliary controller to track the correct position of sync, even if the position is changing by relatively small amounts, and insures that a stable sampling window is provided to the clock generator 42, even if the clock generator 42 is not synchronized with burst. Since the flag pulse is generated by the main horizontal counter and decode block 26, generation of the flag pulse is substantially immune to noise and to the absence of valid sync pulses, and therefore the opening of the sampling window is more reliable than in the conventional circuit. This being so, the clock generator 42 is able to become synchronized with the color subcarrier, provided that the auxiliary controller block is able to accurately determine the position of sync. Since the clock generator 42 receives reliable sampling windows from main counter block, the pulses CK will be accurately timed in relation to the color subcarrier and so the auxiliary horizontal lock-up device 4 receives reliable timing pulses. Of course, if the device 4 loses lock to sync, so that the pulse WR falls outside the pulse MHSW, the counter 262 is reset by the pulses ALP and H shift, as described with reference to the main controller block 24. Thus, the auxiliary counter 122 is able to make fine adjustments to the position of the pulse ALP relative to sync, while coarse adjustments are made by means of the horizontal shift block 18.

It will be recalled that the counter 122 is described as counting 910, 910, so that it resets each time it reaches a count of 910. The need to permit reset in response to a pulse WR which occurs at a count of e.g., 913 (910+3) is accommodated by allowing the counter to be reset at a count of 3.

The adjustment of the duration of the pulse AMP (from ±4 of 910 to ±2 of 910) in the event of a noisy signal is controlled by the noise count block 20.

It will be appreciated that an attempt has been made to avoid burdening the drawings and description with details which are not necessary to an understanding of the invention. Thus, details of the internal arrangement of the blocks illustrated in FIGS. 2 and 3 have not been provided, since it will be understood by persons skilled in the art from the description that has been given that these various components can be implemented readily using commercially available integrated circuits. Similarly, while all the signal lines are illustrated in the drawings as individual lines, it will be understood that in many cases multiple-line buses would in fact be used. Only those functions of the main controller 24 that are necessary to an understanding of the present invention have been described. In the preferred embodiment of the invention several additional functions are also provided. For example, the controller 24 generates color frame information by means of the field reference pulse, horizontal timing information and vertical timing information. In order to assure proper timing within the controller 24, it may be necessary to latch various input pulses before performing the combinational logic functions.

It will be appreciated that the invention is not restricted to the particular method and apparatus which have been described, since variations may be made therein without departing from the scope of the invention as defined in the appended claims, and equivalents thereof. For example, as noted above, the invention is applicable not only to gen-lock circuits but also to other applications in which it is necessary to recover timing information from a noisy input signal.

I claim:

1. A method of generating timing pulses in response to an input signal which includes a train of nominally periodic pulses, comprising detecting a pulse of the input signal, determining whether the detected pulse is a pulse of said train of nominally periodic pulses, employing a detected pulse of said pulse train to initiate cyclical production of pulses with a period dependent on the nominal period of said pulse train, and using the cyclically produced pulses to generate said timing pulses.

2. Apparatus for generating timing pulses in response to an input signal which includes a train of nominally periodic pulses, comprising:
   first means for detecting a pulse of the input signal;
   second means for determining whether the detected pulse is a pulse of said train of nominally periodic pulses;
   third means for employing a detected pulse of said pulse train to initiate cyclical production of pulses with a period dependent on the nominal period of said pulse train; and
   fourth means for using the cyclically produced pulses to generate said timing pulses.

3. Apparatus according to claim 2, wherein the input signal is a sequence of digital pulses provided by a video sync separator, and said first means comprise an edge detection and level qualification block for providing a first pulse at the leading edge of a pulse of the input signal and a second pulse which commences only after the pulse of the input signal has lasted a duration such that it probably represents a sync pulse of the input video signal.

* * * * *